(12) United States Patent
Sasinowski et al.

(10) Patent No.: US 8,388,028 B2
(45) Date of Patent: Mar. 5, 2013

(54) FLUID LINE HAVING CRIMP JOINT

(75) Inventors: Raymond H. Sasinowski, Brighton, MI (US); Alfred A. Gunther, Macomb, MI (US); Jeffrey L. Despard, Franklin, MI (US); Ryan Lebold, Kitchener (CA); Gary A Blair, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 12/785,921

(22) Filed: May 24, 2010

(65) Prior Publication Data

US 2011/0095524 A1  Apr. 28, 2011

Related U.S. Application Data

(60) Provisional application No. 61/254,048, filed on Oct. 22, 2009.

(51) Int. Cl.
  *F16L 33/00*  (2006.01)
(52) U.S. Cl. ............... 285/242; 285/239; 285/256
(58) Field of Classification Search ........... 285/239, 285/241–242, 256, 104, 108, 382; 138/109, 138/120
  See application file for complete search history.

(56) References Cited

U.S. PATENT DOCUMENTS

| | | | | |
|---|---|---|---|---|
| 1,786,489 A * | 12/1930 | Hopkins | | 285/256 |
| 3,185,500 A * | 5/1965 | Luther | | 285/4 |
| 3,224,794 A * | 12/1965 | Crissy | | 285/40 |
| 3,423,109 A * | 1/1969 | New et al. | | 285/222.1 |
| 4,114,656 A * | 9/1978 | Kish | | 138/109 |
| 4,522,435 A * | 6/1985 | Miller et al. | | 285/256 |
| 4,690,435 A * | 9/1987 | Manning et al. | | 285/256 |
| 4,991,876 A * | 2/1991 | Mulvey | | 285/21.1 |
| 5,044,671 A * | 9/1991 | Chisnell et al. | | 285/55 |
| 5,096,231 A * | 3/1992 | Chisnell et al. | | 285/55 |
| 6,419,278 B1 * | 7/2002 | Cunningham | | 285/256 |
| 6,598,905 B2 * | 7/2003 | Campbell et al. | | 285/256 |
| 7,249,787 B1 * | 7/2007 | Chisnell | | 285/256 |
| 2002/0084650 A1 * | 7/2002 | Campbell et al. | | 285/256 |
| 2006/0226650 A1 * | 10/2006 | Alder et al. | | 285/259 |
| 2010/0084860 A1 * | 4/2010 | Cariccia et al. | | 285/256 |

\* cited by examiner

*Primary Examiner* — Aaron Dunwoody
*Assistant Examiner* — Fannie Kee

(57) ABSTRACT

A fluid line having a crimp joint comprises a flexible hose, a tube and a ferrule. The tube has a tube stem portion located in the flexible hose, with the tube stem portion including a first flat portion adjacent to the free end, a second flat portion, a third flat portion, a first tube stem bead located between the first and second flat portions and extending radially outward, and a tube stem groove located between the second and third flat portions and extending radially inward. A ferrule is located radially outward from the flexible hose, with the ferrule including a first crimp tooth located radially outward from the first flat portion, a second crimp tooth located radially outward from the second flat portion, and a third crimp tooth located radially outward from the third flat portion, wherein the crimp teeth are out of phase with the bead and the groove.

11 Claims, 2 Drawing Sheets

FLUID LINE HAVING CRIMP JOINT

CROSS REFERENCE TO RELATED APPLICATIONS

This application claims priority to and the benefit of U.S. Provisional Application No. 61/254,048, Filed Oct. 22, 2009, the full disclosure of which is incorporated herein by reference.

BACKGROUND OF INVENTION

The present invention relates generally to fluid lines and more particularly to fluid lines having one or more crimp joints connecting portions of the line.

Many types of vehicles include lines that include crimp joints that connect different portions of the line together. For example, a transmission oil cooler line may have a flexible hose connected between first and second rigid tubes, with crimp joints connecting the first tube to the hose and another crimp joint connecting the second tube to the opposite end of the hose. It is important that these joints do not leak, even when the vehicle is operating in very cold ambient conditions (such as −50 degrees Celsius) with the line containing a fluid under high pressure (such as 2100 Kilopascal). To assure this, some have created these crimp joints with an O-ring in the crimp joint between the tube and the hose. While this may prevent the leaking, the use of an O-ring makes the joint more expensive than is desired. Thus, it is desired to provide joints between the hose and the tubes that will avoid leaking under low temperature, high pressure conditions, while minimizing the overall cost of the hose.

SUMMARY OF INVENTION

An embodiment contemplates a fluid line having a crimp joint. The fluid line may comprise a flexible hose having a first end, a tube and a ferrule. The tube may have a tube stem portion adjacent to a free end located in the first end of the flexible hose, with the tube stem portion including a first flat portion adjacent to the free end, second flat portion spaced farther from the free end than the first flat portion, a third flat portion spaced farther from the free end than the second flat portion, a first tube stem bead located between the first and second flat portions and extending radially outward farther than the first and second flat portions, and a tube stem groove located between the second and third flat portions and extending radially inward farther than the second and third flat portions. A ferrule may be located radially outward from the first end of the flexible hose so as to sandwich the flexible hose between the ferrule and the tube stem portion, with the ferrule including a first crimp tooth located radially outward from the first flat portion and compressing the flexible hose between the first crimp tooth and the first flat portion, a second crimp tooth located radially outward from the second flat portion and compressing the flexible hose between the second crimp tooth and the second flat portion, and a third crimp tooth located radially outward from the third flat portion and compressing the flexible hose between the third crimp tooth and the third flat portion, wherein the first, second and third crimp teeth are out of phase with the tube stem bead and the tube stem groove.

An advantage of an embodiment is that the crimp teeth being out of phase with features on a tube stem portion of a tube creates a crimp joint that connects a flexible hose to the tube with a much reduced chance of leakage, even when operating under very cold, high fluid pressure conditions, while also minimizing the costs of the crimped joint.

DETAILED DESCRIPTION

Figure 1:
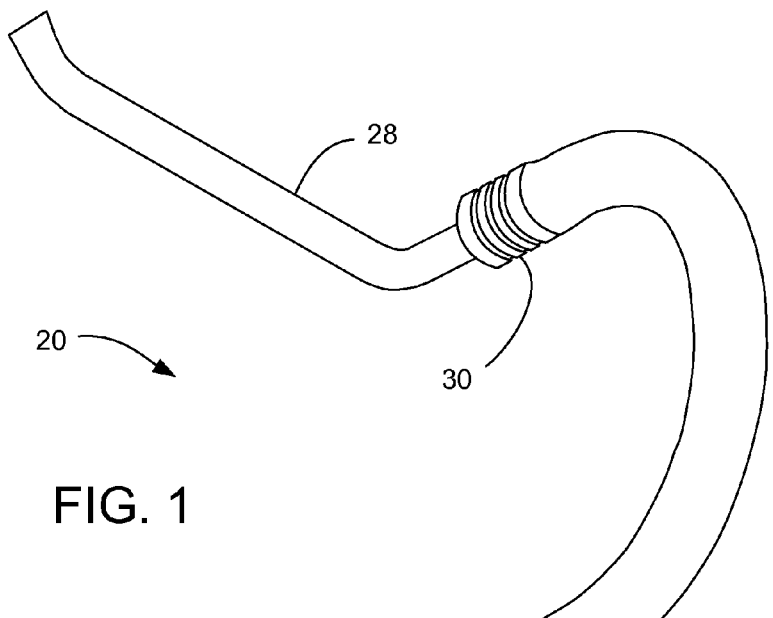
FIG. 1 is a perspective view of a fluid line.

Referring to FIG. 1, a fluid line, indicated generally at 20, is shown. The fluid line 20 may be, for example, a transmission oil cooler line that allows the flow of pressurized fluid therethrough. The fluid line 20 includes a flexible hose 22 that connects at a first end to a first tube 24 via a first crimp joint 26 and connects at a second end to a second tube 28 via a second crimp joint 30. The tubes 24, 28 may be made of a stiff material such as, for example, steel, and the flexible hose 22 may be made of a flexible material, such as, for example, rubber.

Figure 2:
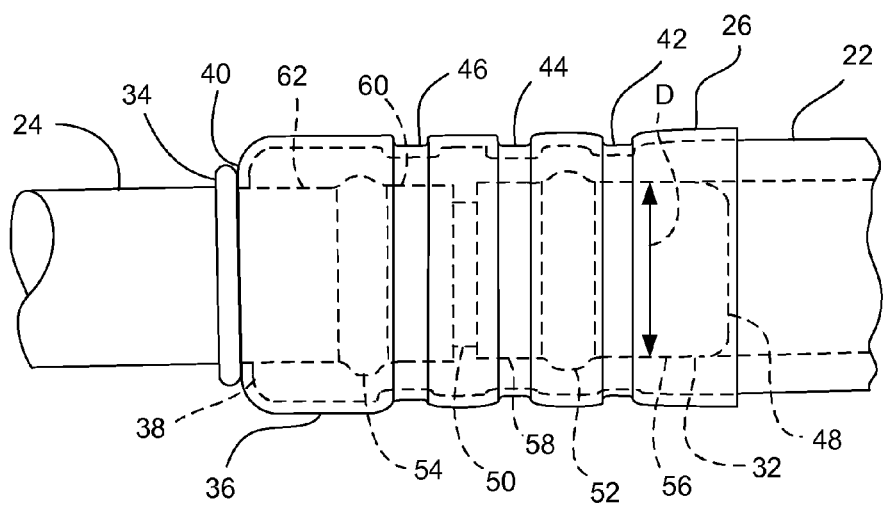
FIG. 2 is a side view of a portion of the fluid line.

FIG. 2 shows a portion of the first tube 24 and hose 22 connected at the first crimp joint 26. While the first crimp joint 26 is shown in more detail, the second crimp joint may be configured the same as the first crimp joint 26 and so will not be shown in more detail herein. A ferrule 36 has an initial inside diameter (when uncompressed) that allows it to slide over the first end 38 of the hose 22 until the first end 38 of the hose 22 abuts a terminal end 40 of the ferrule 36. The hose 22 has an inside diameter that is large enough to allow it (and the uncompressed ferrule 36) to slide over the outside of a tube stem portion 32 of the first tube 24 until the terminal end 40 of the ferrule 36 reaches a stop ring 34 at the end of the tube stem portion 32. With the terminal end 40 against the stop ring 34, a crimp tool (not shown) creates the circumferentially extending crimp teeth, including a first crimp tooth 42, a second crimp tooth 44 and a third crimp tooth 46 (as shown in FIG. 2). The forming of the crimp teeth 42, 44, 46 compresses the hose 22 between the inside of the ferrule 36 and the outside of the tube stem portion 32 of the first tube 24, sealing the hose 22 to the first tube 24. The stop ring 34 is optional and so some other means may be employed to indicate alignment of the ferrule 36 relative to the first tube 24, if so desired.

Figure 3:
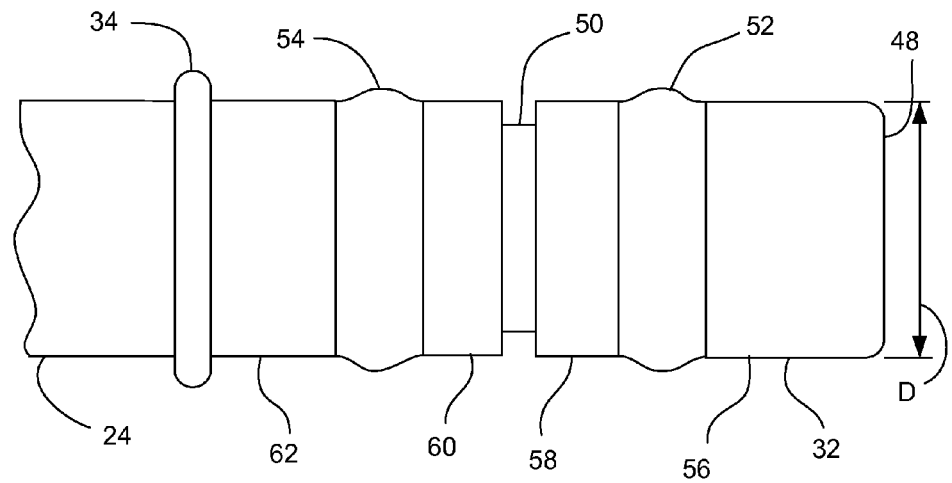
FIG. 3 is a side view of a portion of a tube used in the fluid line assembly.

The location and the spacing of the crimp teeth 42, 44, 46 relative to features on the tube stem portion 32 will be discussed relative to FIGS. 2 and 3. The tube stem portion 32 extends from a free end 48 of the first tube 24 to the stop ring 34. The tube stem portion 32 includes three features, a tube stem groove 50, a first tube stem bead (bump) 52 and a second tube stem bead (bump) 54. The tube stem portion 32 also includes a first flat portion 56, a second flat portion 58, a third flat portion 60 and a fourth flat portion 62. The first flat portion extends between the free end 48 and the first tube stem bead 52. The second flat portion 58 extends between the first tube stem bead 52 and the tube stem groove 50. The third flat portion 60 extends between the tube stem groove 50 and the second tube stem bead 54. And the fourth flat portion 62 extends between the second tube stem bead 54 and the stop ring 34. The crimp teeth 42, 44, 46 are aligned with the first, second and third flat portions 56, 58, 60, respectively rather than being aligned with the features. Thus, the crimp teeth 42, 44, 46 are out of phase with the features on the tube stem portion 32.

The term "feature" as used herein includes tube stem grooves and tube stem beads. The term "tube stem groove" as used herein means a portion of the tube stem portion 32 that extends circumferentially around the tube stem portion 32 and is recessed radially inward from a nominal outer diameter D of the tube stem portion 32, without any O-ring or other insert in the groove that radially increases the effective diameter of the groove to at or radially beyond the nominal outer diameter D of the tube stem portion 32. Thus, any radially recessed portion of a tube stem portion that has an O-ring or other member mounted therein that extends radially to or beyond the nominal outer diameter D of a tube stem portion is not a tube stem groove. The term "tube stem bead" as used herein means a portion of the tube stem portion 32 that extends circumferentially around the tube stem portion 32 and extends radially outward from the nominal outer diameter D of the tube stem portion 32. The term "flat portion" as used herein means a portion of the tube stem portion 32 that has a cylindrical shape and is radially at the nominal outer diameter D of the tube stem portion 32. The term "out of phase" means that the crimps in the ferrule 36 all align radially outward from a flat portion of the tube stem portion, so that none of the crimps aligns radially outward from one of the features. This can be seen in FIG. 2, where the crimps 42, 44, 46 align radially outward from flat portions 56, 58, 60, respectively, with none of the crimps aligning radially outward from any of the three features.

Alternatively, the tube stem portion 32 may have just one of the two tube stem beads and the tube stem groove, rather than the two tube stem beads. However, this arrangement may not be as reliable in leak protection over the life of fluid line 20 as a tube stem portion 32 having both tube stem beads 52, 54.

Figure 4:
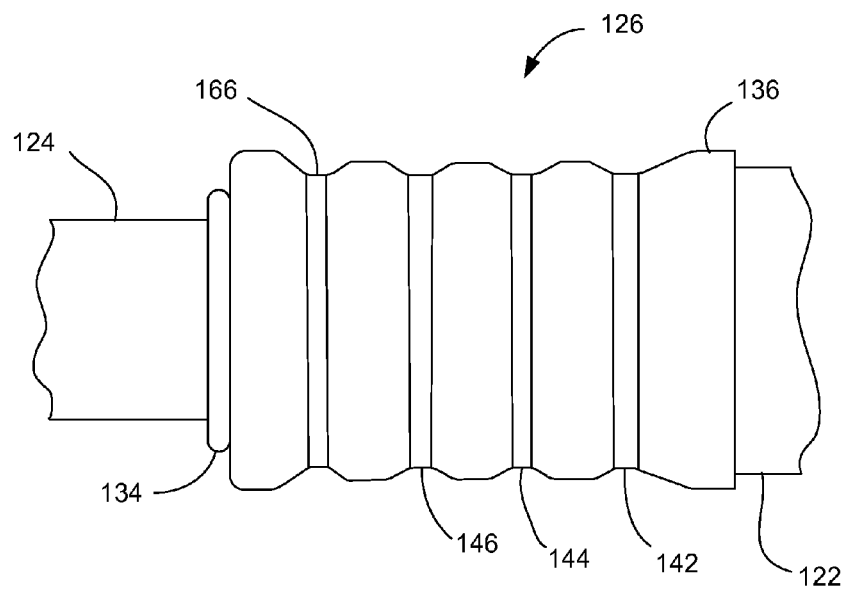
FIG. 4 is a side view of a portion of a fluid line according to second embodiment.

FIG. 4 illustrates a second embodiment. Since this embodiment is similar to the first, similar element numbers will be used for similar elements, but employing 100-series numbers. In this embodiment, the crimp joint 126 joining the flexible hose 122 to the first tube 124 may include a fourth crimp tooth 166 in the ferrule 136 in addition to the first three crimp teeth 142, 144, 146. The crimp teeth 142, 144, 146, 166 are still located out of phase with all of the features on the tube stem portion. In this embodiment, then, the fourth crimp tooth 166 may be radially outward from the fourth flat portion (not shown in this figure, but shown in FIGS. 2 and 3). Alternatively, there may be an additional tube stem bead (not shown) between the second tube stem bead (not shown in this figure, but shown in FIGS. 2 and 3) and the stop ring 134, with the fourth crimp tooth 166 radially outward from a flat portion located between the second tube stem bead and the additional tube stem bead.

While certain embodiments of the present invention have been described in detail, those familiar with the art to which this invention relates will recognize various alternative designs and embodiments for practicing the invention as defined by the following claims.

What is claimed is:

1. A fluid line having a crimp joint comprising:
   a flexible hose having a first end;
   a tube having a tube stem portion adjacent to a free end, the tube stem portion and free end being located in the first end of the flexible hose, the tube stem portion including a first flat portion adjacent to the free end, a second flat portion spaced farther from the free end than the first flat portion, a third flat portion spaced farther from the free end than the second flat portion, a first tube stem bead located between and adjacent to the first and second flat portions and extending radially outward farther than the first and second flat portions, and a tube stem groove located between and adjacent to the second and third flat portions and extending radially inward farther than the second and third flat portions, the tube stem groove defining a pair of side walls and a radially inner wall extending between the side walls, with a portion of the flexible hose in contact with the radially inner wall; and wherein the tube stem portion includes a fourth flat portion spaced farther from the free end than the third flat portion, and a second tube stem bead located between the third and fourth flat portions and extending radially outward farther than the third and fourth flat portions; and
   a ferrule located radially outward from the first end of the flexible hose so as to sandwich the flexible hose between the ferrule and the tube stem portion, the ferrule including a first crimp tooth located radially outward from the first flat portion and compressingly securing the flexible hose between the first crimp tooth and the first flat portion, a second crimp tooth located radially outward from the second flat portion and compressingly securing the flexible hose between the second crimp tooth and the second flat portion, and a third crimp tooth located radially outward from the third flat portion and compressingly securing the flexible hose between the third crimp tooth and the third flat portion, wherein the first, second and third crimp teeth are out of phase with the tube stem bead and the tube stem groove.

2. The fluid line of claim 1 wherein the tube includes a stop ring extending radially outward and located farther from the free end than the third flat portion, and the ferrule includes a terminal end that abuts the stop ring when the ferrule is positioned correctly relative to the tube stem portion.

3. The fluid line of claim 2 wherein the ferrule includes a fourth crimp tooth located radially outward from the fourth flat portion and compressingly securing the flexible hose between the fourth crimp tooth and the fourth flat portion, wherein the fourth crimp tooth is out of phase with the tube stem bead and the tube stem groove.

4. The fluid line of claim 1 wherein the ferrule includes a fourth crimp tooth located radially outward from the fourth flat portion and compressingly securing the flexible hose between the fourth crimp tooth and the fourth flat portion, wherein the fourth crimp tooth is out of phase with the tube stem bead and the tube stem groove.

5. The fluid line of claim 1 wherein the flexible hose is made of rubber.

6. The fluid line of claim 1 wherein the tube is made of steel.

7. A fluid line having a crimp joint comprising:
   a flexible hose having a first end;
   a tube having a tube stem portion adjacent to a free end, the tube stem portion and free end being located in the first end of the flexible hose, the tube stem portion including a first flat portion adjacent to the free end, a second flat portion spaced farther from the free end than the first flat portion, a third flat portion spaced farther from the free end than the second flat portion, a fourth flat portion spaced farther from the free end than the third flat portion, a first tube stem bead located between the first and second flat portions and extending radially outward farther than the first and second flat portions, a tube stem groove located between the second and third flat portions and extending radially inward farther than the second and third flat portions, and a second tube stem bead located between the third and fourth flat portions and extending radially outward farther than the third and fourth flat portions, the tube stem groove defining a pair of side walls and a radially inner wall extending between the side walls, with a portion of the flexible hose in contact with the radially inner wall; and a ferrule located radially outward from the first end of the flexible hose so as to sandwich the flexible hose between the ferrule and the tube stem portion, the ferrule including a first crimp tooth located radially outward from the first flat portion and compressingly securing the flexible hose between the first crimp tooth and the first flat portion, a second crimp tooth located radially outward from the second flat portion and compressingly securing the flexible hose between the second crimp tooth and the second flat portion, and a third crimp tooth located radially outward from the third flat portion and compressingly securing the flexible hose between the third crimp tooth and the third flat portion, wherein the first, second and third crimp teeth are out of phase with the first and second tube stem beads and the tube stem groove.

8. The fluid line of claim 7 wherein the tube includes a stop ring extending radially outward and located farther from the free end than the fourth flat portion, and the ferrule includes a terminal end that abuts the stop ring when the ferrule is positioned correctly relative to the tube stem portion.

9. The fluid line of claim 8 wherein the ferrule includes a fourth crimp tooth located radially outward from the fourth flat portion and compressingly securing the flexible hose between the fourth crimp tooth and the fourth flat portion, wherein the fourth crimp tooth is out of phase with the first and second tube stem beads and the tube stem groove.

10. The fluid line of claim 7 wherein the ferrule includes a fourth crimp tooth located radially outward from the fourth flat portion and compressingly securing the flexible hose between the fourth crimp tooth and the fourth flat portion, wherein the fourth crimp tooth is out of phase with the first and second tube stem beads and the tube stem groove.

11. A fluid line having a crimp joint comprising:

a flexible hose having a first end;

a tube having a tube stem portion adjacent to a free end, the tube stem portion and free end being located in the first end of the flexible hose, the tube stem portion including a first flat portion adjacent to the free end, a second flat portion spaced farther from the free end than the first flat portion, a third flat portion spaced farther from the free end than the second flat portion, a first tube stem bead located between and adjacent to the first and second flat portions and extending radially outward farther than the first and second flat portions, and a tube stem groove located between and adjacent to the second and third flat portions and extending radially inward farther than the second and third flat portions, the tube stem groove defining a pair of side walls and a radially inner wall extending between the side walls, with a portion of the flexible hose in contact with the radially inner wall; and a ferrule located radially outward from the first end of the flexible hose so as to sandwich the flexible hose between the ferrule and the tube stem portion, the ferrule including a first crimp tooth located radially outward from the first flat portion and compressingly securing the flexible hose between the first crimp tooth and the first flat portion, a second crimp tooth located radially outward from the second flat portion and compressingly securing the flexible hose between the second crimp tooth and the second flat portion, and a third crimp tooth located radially outward from the third flat portion and compressingly securing the flexible hose between the third crimp tooth and the third flat portion, wherein the first, second and third crimp teeth are out of phase with the tube stem bead and the tube stem groove; and wherein the tube stem portion includes a fourth flat portion spaced farther from the free end than the third flat portion, and the ferrule includes a fourth crimp tooth located radially outward from the fourth flat portion and compressingly securing the flexible hose between the fourth crimp tooth and the fourth flat portion, wherein the fourth crimp tooth is out of phase with the tube stem bead and the tube stem groove.

\* \* \* \* \*